(12) United States Patent
Zhang et al.

(10) Patent No.: US 6,584,433 B1
(45) Date of Patent: Jun. 24, 2003

(54) HARMONIC AVERAGE BASED CLUSTERING METHOD AND SYSTEM

(75) Inventors: Bin Zhang, Fremont, CA (US); Meichun Hsu, Los Altos Hills, CA (US); Umeshwar Dayal, Saratoga, CA (US)

(73) Assignee: Hewlett-Packard Development Company LP, Houston, TX (US)

(*) Notice: Subject to any disclaimer, the term of this patent is extended or adjusted under 35 U.S.C. 154(b) by 234 days.

(21) Appl. No.: 09/684,719

(22) Filed: Oct. 4, 2000

(51) Int. Cl.⁷ .............................................. G06F 15/00
(52) U.S. Cl. ...................... 702/189; 706/50; 382/240
(58) Field of Search .................... 702/95, 127, 138, 702/179, 180, 181, 183, 189, FOR 137, FOR 139, FOR 141, FOR 146, FOR 170, FOR 171, FOR 172; 706/16, 50; 707/101; 382/110, 240

(56) References Cited

U.S. PATENT DOCUMENTS

| | | | | |
|---|---|---|---|---|
| 4,558,350 A | * | 12/1985 | Murakami | 385/240.12 |
| 5,208,763 A | * | 5/1993 | Hong et al. | 702/95 |
| 5,327,521 A | * | 7/1994 | Savic et al. | 704/272 |
| 5,832,182 A | * | 11/1998 | Zhang et al. | 706/50 |
| 5,943,661 A | * | 8/1999 | Katz | 706/16 |
| 6,100,901 A | * | 8/2000 | Mohda et al. | 345/440 |
| 6,115,708 A | * | 9/2000 | Fayyad et al. | 707/6 |
| 6,285,780 B1 | * | 9/2001 | Yamakita et al. | 382/110 |
| 6,336,082 B1 | * | 1/2002 | Nguyen et al. | 702/179 |
| 6,374,251 B1 | * | 4/2002 | Fayyad et al. | 707/101 |
| 6,421,467 B1 | * | 7/2002 | Mitra | 382/240 |

* cited by examiner

Primary Examiner—Marc S. Hoff
Assistant Examiner—Mohamed Charioui (57) ABSTRACT

A harmonic average data clustering method and system. First, a plurality of data points for clustering is received. Next, a number K of clusters is also received. Then, K center points are initialized. For each center point, a new center position is then determined by utilizing a K-Harmonic Means performance function.

20 Claims, 5 Drawing Sheets

HARMONIC AVERAGE BASED CLUSTERING METHOD AND SYSTEM

FIELD OF THE INVENTION

The present invention relates generally to data clustering and more specifically to a method and system for clustering data by employing a K-Harmonic Means (KHM) center-based iterative algorithm.

BACKGROUND OF THE INVENTION

Data Clustering

Data clustering operates to group or partition a plurality of data points into a predetermined number of clusters or categories based on one or more attributes or features.

The efficiency of a clustering algorithm depends on several factors. First, the computation resources required to implement the clustering algorithm is an important consideration. It is generally desirable to reduce the time needed to generate results (often referred to as the convergence rate) and also reduce the amount of computer resources needed to implement the clustering algorithm. For example, those clustering algorithms (e.g., partition clustering and agglomerative clustering) that are computationally intensive and yet provide only tolerable results have been generally abandoned in favor of those clustering algorithms that are less computationally intensive (e.g., center-based clustering algorithms that are also known as density estimation clustering).

Second, the quality of the generated clusters or categories (often referred to as the convergence quality) is also another important consideration. Ideally, there is one center point for each category or cluster. Unfortunately, the prior art methods often generate clusters or categories with more than one center. These centers are referred to as "trapped centers" (i.e., these centers are trapped by the local data, but actually belong to another cluster or category). Consequently it would be desirable for there to be a mechanism to allow an easier escape of trapped centers.

Third, the sensitivity to center initialization is another important factor. Unfortunately, the prior art clustering methods are very dependent on the initialization information (i.e., the quality of the results varies widely for different initialization information). The initialization information is heavily dependent on the amount and quality of available prior information. As can be appreciated, in many instances, there is minimal or no prior information available. In fact, for many applications the clustering is performed specifically for the sake of obtaining this "prior information."

As described herein below, poor initialization and for that matter what is even considered "good initialization" often results in trapped centers, thereby leading to poor or minimally tolerable results. Consequently, it would be desirable for there to be a mechanism for reducing the dependence of clustering results on the quality and quantity of prior knowledge.

There are many practical and useful applications that can utilize data clustering to improve results. Consequently, there is much interest in developing clustering algorithms or methods that efficiently and effectively cluster data.

Prior Art Data Clustering Methods

K-Means and Expectation Maximization (EM) are two prior art methods for data clustering. Unfortunately, both of these approaches are very sensitive to the initialization of the centers. The dependency of the K-Means performance on the initialization of the centers has been a major problem. A similar problem exists for EM.

There have been numerous attempts to generate "good" initializations in order to address the sensitivity problem. Unfortunately, as illustrated in FIGS. 1A and 1B, "good" initializations often do not generate good clustering results.

In the following example, a K-Means clustering method is used to find 100 clusters of the BIRCH data set (from UC Irvine). The BIRCH data set is composed of 100 normally distributed local clusters, in a 10×10 grid, each having 1000 points. Two experiments are then conducted. The first experiment uses a random initialization, and the second experiment uses an initialization generated by the Furthest Point algorithm, which by itself is considered a clustering algorithm.

Figure 1A:
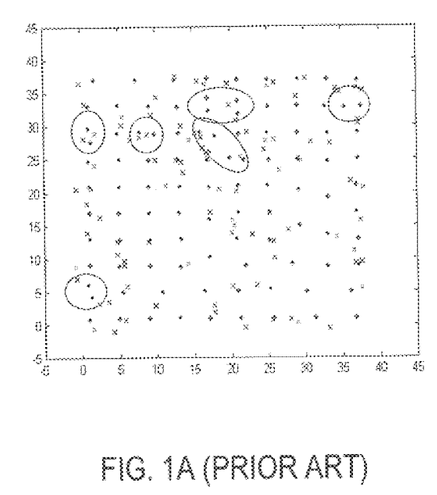
FIG. 1A illustrates a two-dimensional representation of clustering results where a conventional clustering algorithm is applied on a data set with a random initialization.
Figure 1B:
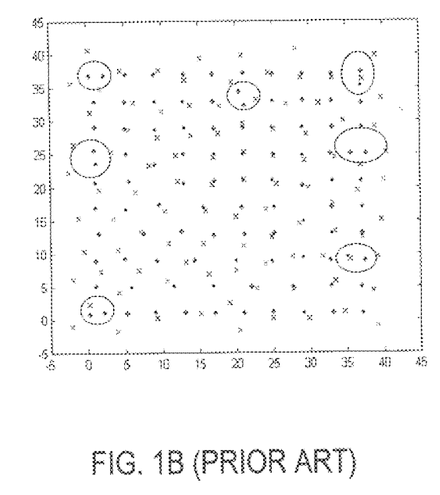
FIG. 1B illustrates a two-dimensional representation of clustering results where the same conventional clustering algorithm of FIG. 1A is applied on the same data set with a FPA initialization.

In FIGS. 1A and FIG. 1B, the initial locations of the centers denoted with "x"s, and the converged locations of the centers are denoted with dots. Both experiments are provided with 100 initial center positions. At first glance, the second initialization appears to provide a better result than the first one. However, upon closer inspection, there are exactly seven pairs of centers trapped by local densities in the local optima K-Means converged to under both initializations. These trapped center pairs are circled as shown. As is well known, the best convergence (or global optimum) should have exactly one center in each local cluster of the data. Consequently, from the point of view of the number of trapped centers, both of these approaches have similarly poor results though different initializations are utilized.

Referring to FIGS. 1A and 1B, it is noted that these approaches to provide a "good" initialization often generate poor results. In FIG. 1A, a random initialization of the center points is utilized. In FIG. 1B, the center points are initialized by utilizing a Furthest Point Algorithm (FPA). The result is that there are seven pairs of centers that are trapped by local densities for both the random initialization and the FPA initialization. Consequently, at least for this set of data points, there is essentially no improvement in the clustering results even though a "good" initialization method is employed in FIG. 1B. This example illustrates that what constitutes a "good" initialization may not be understood very well by those attempting to improve clustering results of K-means or EM by generating "good" initializations.

Accordingly, there remains a need for a method and system for data clustering that improves the convergence rate, that improves the convergence quality, that allows for an easier escape of trapped centers, that reduces the dependence of clustering results on center initialization, and that overcomes the disadvantages set forth previously.

SUMMARY OF THE INVENTION

It is an object of the present invention to provide a clustering method and system for reducing the dependency of clustering results to the initialization of centers.

It is yet another object of the present invention to provide a clustering method and system for improving the quality of the clustering results (i.e., the convergence quality) of the clustering.

It is a further object of the present invention to provide a clustering method and system for improving the convergence rate of the clustering.

It is another object of the present invention to provide a clustering method and system for distributing the association of the data points with centers to allow a continuous transition (instead of an abrupt transition) of a center from a first set of data points to a second set of data points.

It is yet another object of the present invention to provide a clustering method and system for reducing the strength of association of the data points in a cluster to allow an easier escape of trapped centers.

A harmonic average data clustering method and system. First, a plurality of data points for clustering is received. Next, a number K of clusters is also received. Then, K center points are initialized. For each center point a new center position is then determined by utilizing a K-Harmonic Means performance function.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. The following description and the drawings are illustrative of the invention and are not to be construed as limiting the invention.

Exemplary Data Clustering Application

Before delving into the details of the harmonic average clustering method and system of the present invention, an exemplary application is first described to familiarize the reader with concepts related to the invention.

As noted previously, clustering seeks to locate dense regions of data that have similar attributes or features and generate categories or clusters of these "similar" data points. These attributes or features can be a qualitative (e.g., similar behavior, tastes, likes, dislikes of consumers), or a quantitative measure (e.g., the number of items purchased by customers across a predefined time period).

In this example, the set of data points includes a plurality of car brokers or dealers. This application uses two attributes or features for the clustering. The first attribute is the number of sedans that the particular dealer has sold in the last year, and the second attribute is the number of sports cars, the particular dealer has sold in the last year.

This particular application seeks to group the car dealers into clusters, such as a first cluster of car dealers that are particularly good at selling sedans, a second cluster of car dealers that are particularly good at selling sports cars, and perhaps a third cluster of car dealers that are good at selling both sports cars and sedans.

Center-based clustering algorithms operate by receiving the number of desired clusters, initialization information (e.g., the random initial positions of centers), and based thereon generates center points that are at the center of clusters of data. In this case, since there are three desired clusters, three center points with initial points are provided to the clustering algorithm.

Ideally, a good clustering method moves the center positions to the three clusters of data (i.e., a first center is moved to the center of those car dealers that sell high numbers of sedans, a second center is moved to the center of those car dealers that sell high numbers of sports cars, and a third center is moved to the center of the car dealers that sell a high number of both sports cars and sedans).

However, when prior art clustering methods are applied to this data set of car dealers, the clusters tend to trap more than one center. For example, a third category of those car dealers can trap two centers only one of which is properly retained. The other center rightfully belongs to and should be located in, for example, the first category of those car dealers that sell a high number of sedans. In another example, the third category of those car dealers can trap three centers, only one of which is rightfully retained. The other two centers can rightfully be located in the first and second categories, respectively.

Figure 7A:
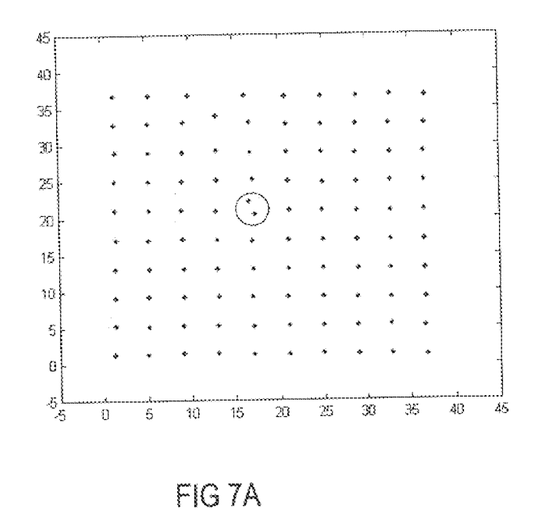
FIG. 7A illustrates a two-dimensional representation of clustering results where the harmonic average clustering of the present invention is applied on a data set with a random initialization.
Figure 7B:
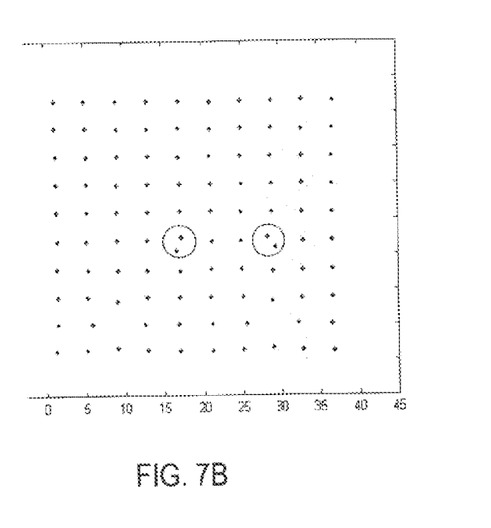
FIG. 7B illustrates a two-dimensional representation of clustering results the where the harmonic average clustering of the present invention of FIG. 7A is applied on the same data set with a FPA initialization.

The harmonic average clustering method and system of the present invention addresses the "trapped centers" problem and allows the centers to navigate to the categories to which the center belongs. Consequently, when the clustering method of the present invention is applied to this data set of car dealers, the three centers are properly located at the center of each category. FIGS. 7A and 7B further illustrate how the clustering method and system of the present invention reduces the number of the centers trapped by prior art clustering methods (shown in FIGS. 1A and 1B). By reducing the number of trapped centers, the present invention increases the number of properly identified data clusters.

Figure 2:
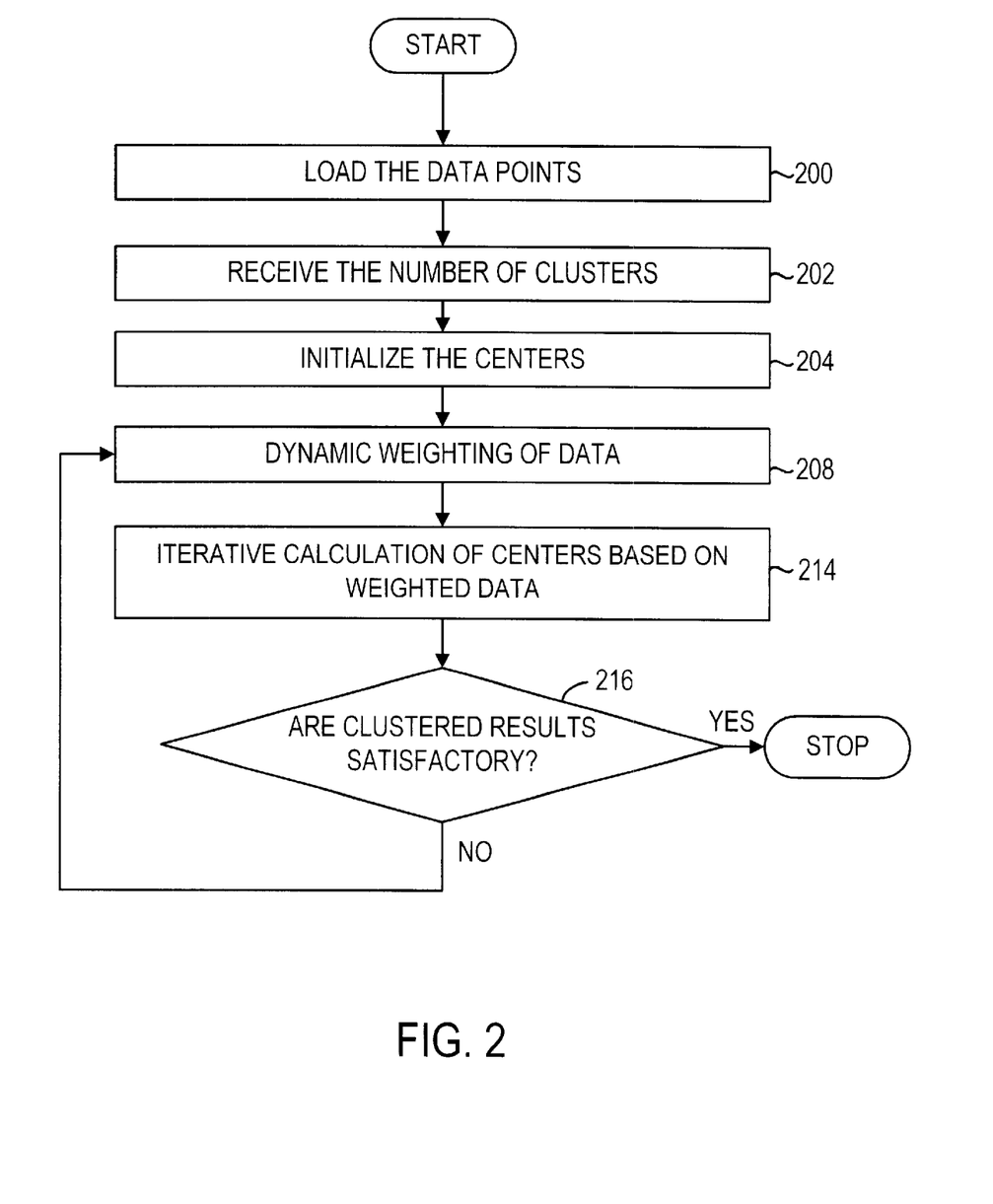
FIG. 2 is a flowchart illustrating the method of one embodiment of the present invention.

FIG. 2 is a flowchart illustrating the method of one embodiment of the present invention. In step 200, a data set having a plurality of data points is loaded or received. In step 202, the number of clusters is received. For example, a user can specify the number of clusters. In step 204, the centers are initialized (i.e., the centers are assigned an initial position). It is noted that any initialization scheme may be utilized. For example, a random initialization can be used. In step 208, each data point is dynamically weighted. The mechanism for dynamically weighting the data points is described in greater detail hereinafter. In step 214, the new positions of each center are determined in an iterative fashion based on the center positions determined from the previous iteration. Preferably, steps 208 and 214 are repeated until the results converge, and the most desirable locations are determined for each center point. This iterative process and how the present invention utilizes a harmonic average performance function for clustering are described in greater detail hereinafter.

The iterative process can stop after a predetermined convergence metric (e.g., the harmonic average performance function) is in a predetermined relationship with a predetermined value (e.g., the metric is less than a predetermined value). Alternatively, the iterative process can stop when the improvement in the convergence metric is less than a predetermined value.

Exemplary Data Set

Figure 3:
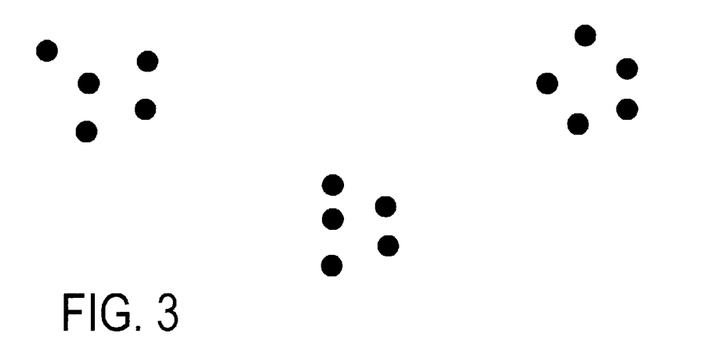
FIG. 3 illustrates a data set that is received in step 200 of FIG. 2.
Figure 4:
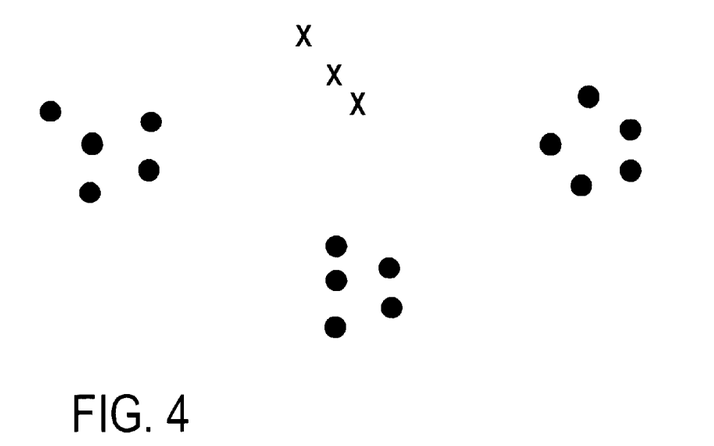
FIG. 4 illustrates the initialization of centers that is performed in step 204 of FIG. 2.
Figure 5:
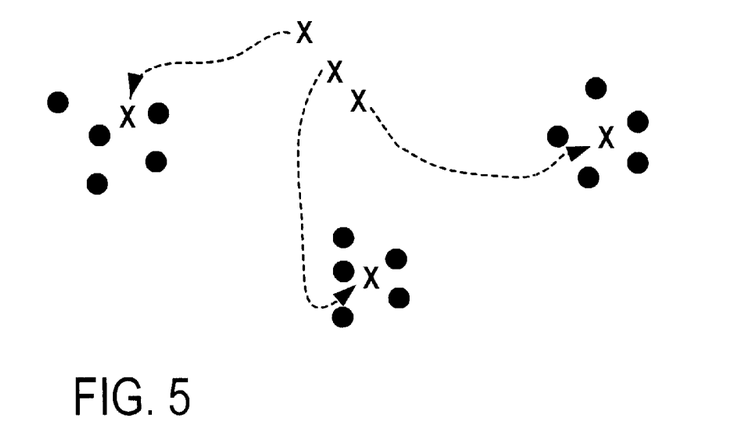
FIG. 5 illustrates the iterative determination of new positions of centers that is performed in steps 208 to 214 of FIG. 2.

FIG. 3 illustrates an exemplary data set that can be received in step 200 of FIG. 2. FIG. 4 illustrates an exemplary initialization of centers that is performed in step 204 of FIG. 2. FIG. 5 illustrates the iterative determination of new positions of centers that is performed in steps 208 to 214 of FIG. 2. Each center moves to a new position after each iteration until the optimal position is attained.

Dynamic Weighting of Data

As noted in the Background, one disadvantage of the prior art clustering methods is trapped centers. Ideally, related data is grouped into the same cluster, and unrelated data into different clusters. However, the prior art clustering methods tend to have trapped centers (i.e., more than one center) for certain data clusters even with "good" initializations. One aspect of the present invention is a mechanism for avoiding trapped centers.

K-Harmonic Means Performance Function

The present invention uses a K-harmonic means performance function to determine new center positions. The K-harmonic means performance function is defined to be the sum over all data points of the geometric average of the distance of a data point to all the centers. Let $\{m_l | l=1, \ldots, K\}$ be K centers and $\{x_i | i=1, \ldots, N\}$ be the N given data points, the K-Harmonic Means performance function, measuring how well the centers are positioned, is $$Perf_{KGM}(\{x_i\}_{i=1}^{N}, \{m_l\}_{l=1}^{K}) = \sum_{i=1}^{N} \frac{1}{\sum_{l=1}^{K} \frac{1}{\|x_i - m_l\|^2}}$$

The quantity inside the outer summation is called the geometric average of $\{\|x-m_l\| \, | \, l=1, \ldots, K\}$.

To simplify the notations, let $d_{i,l} = \|x_i - m_l\|$, or $d_{x,m} = \|x - m\|$. By taking the derivative of the K-G-Means' performance function with respect to $m_k$, $k=1, \ldots, K$, and setting it to zero, the following expression results:

$$\frac{\partial Perf_{KGM}(X, M)}{\partial \vec{m}_k} = \sum_{i=1}^{N} \frac{2 * (\vec{x}_i - \vec{m}_l)}{\left(d_{i,k}^3 \left(\sum_{l=1}^{K} \frac{1}{d_{i,l}^2}\right)\right)^2} = 0.$$

Arrows are put on top of the vectors to distinguish them better from the scalar quantities. "Solving" $m_k$'s from the above, the following recursive formula is obtained:

$$\vec{m}_k = \frac{\sum_{i=1}^{N} \frac{1}{\left(d_{i,k}^3 \left(\sum_{l=1}^{K} \frac{1}{d_{i,l}^2}\right)\right)^2} \vec{x}_i}{\sum_{i=1}^{N} \frac{1}{\left(d_{i,k}^3 \left(\sum_{l=1}^{K} \frac{1}{d_{i,l}^2}\right)\right)^2}} = \frac{\sum_{i=1}^{N} \frac{\frac{1}{d_{i,k}^3}}{\sum_{l=1}^{K} \frac{1}{d_{i,l}^3}} * \frac{\sum_{l=1}^{K} \frac{1}{d_{i,l}^3}}{\left(\sum_{l=1}^{K} \frac{1}{d_{i,l}^2}\right)^2} \vec{x}_i}{\sum_{i=1}^{N} \frac{\frac{1}{d_{i,k}^3}}{\sum_{k=1}^{K} \frac{1}{d_{i,l}^3}} * \frac{\sum_{l=1}^{K} \frac{1}{d_{i,l}^3}}{\left(\sum_{l=1}^{K} \frac{1}{d_{i,l}^2}\right)^2}}$$

where $d_{i,k} = \|x_i - m_k\|$.

$$p(m_k | x_i) = \frac{\frac{1}{d_{i,k}^3}}{\sum_{l=1}^{K} \frac{1}{d_{i,l}^3}}, \quad \text{and}$$

$$a(x) = \frac{\sum_{l=1}^{K} \frac{1}{\|x - m_l\|^3}}{\left[\sum_{l=1}^{K} \frac{1}{\|x - m_l\|^2}\right]^2} = \|x - m_{\min\_x}\| * \frac{\sum_{l=1}^{K} \left(\frac{\|x - m_{\min\_x}\|}{\|x - m_l\|}\right)^3}{\left[\sum_{l=1}^{K} \left(\frac{\|x - m_{\min\_x}\|}{\|x - m_l\|^2}\right)^2\right]^2}.$$

It is noted that the K-Harmonic Means clustering method and system of the present invention utilizes a dynamic weighting factor that can be the function $a(x)$. The weight of a data point goes to zero as the data point approaches one of the centers (or more properly, when the data point is approached by one of the centers). The dynamic weighting factor of the present invention has the effect of flattening out local optimum.

The dynamic weighting function, $a_M(x)$, is designed to significantly reduce the sensitivity of the convergence quality to the initialization of the centers. A factor, $\|x - m_{min\_x}\|^{4-s}$, in $a(x)$ forces the weight to zero as $x$ is approached by a center. When there are more centers near a data point, the weight for that data point is decreased. For example, before trapping any centers, the data points may have a dynamic weight of one. However, after a particular data point traps a center, the dynamic weight for that data point can be a fraction, such as ½ or ⅓. Accordingly, the attraction experienced by a second center from the data is reduced (i.e., dynamically weighted) to allow trapped centers (e.g., the second center) to escape and reach its optimal cluster.

As noted previously, the dynamic weighting mechanism of the present invention effectively flattens out a local density that has trapped more than one center. Since the weight of each data point in the calculation of the center locations in the next iteration depends on the current location of the centers, the present invention "dynamically weights" the data points.

When the prior art clustering methods, such as K-Means or by EM, are applied to data sets, it is noted that local clusters tend to trap more than one center. For example, the experimental results on birch data set with 100 centers indicate that there are a few local clusters that trapped two centers. The local density of data is high enough to trap the two centers even though globally moving one center to a different place gives a better optimal. In contrast, by lowering the weight of the data points that are very close to those centers, the present invention helps the centers to escape from the trap.

Clustering System 600

Figure 6:
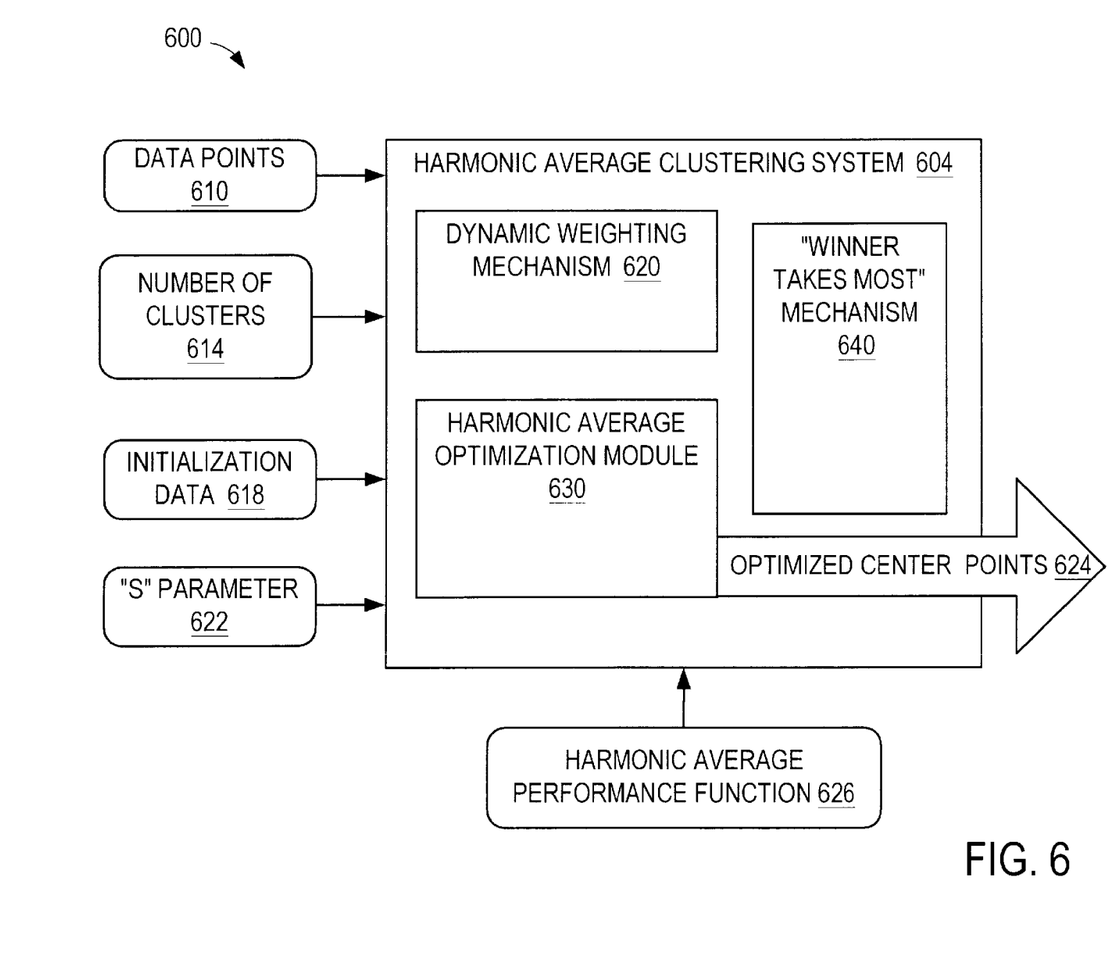
FIG. 6 is a block diagram illustration of a system in which the clustering method of the present invention can be implemented.

FIG. 6 is a block diagram illustration of a system 600 in which the clustering method of the present invention can be implemented. The system 600 includes a harmonic average clustering system 604 coupled to an initialization source 606. The harmonic average clustering system 604 includes a first input for receiving the data points 610, a second input for receiving the number 614 of clusters, a third input for receiving the initialization data 618 (e.g., initial center points), a fourth input for receiving the s parameter, and a fifth input for receiving the harmonic average performance function 626. Based on these inputs, the harmonic average clustering system 604 generates the optimized center points 624.

The harmonic average clustering system 604 includes a dynamic weighting mechanism 620 for selectively weighting the data points based on the number of currently trapped centers. The dynamic weighting of the data points allows an easier escape of trapped centers and can be adjusted by changing the value of the s parameter. A harmonic average optimization mechanism is provided for receiving the harmonic average performance function 626 and utilizing the harmonic average performance function 626 to generate new center points. A "winner-takes-most" mechanism 640 is provided for improving the transition of centers from one data cluster to another data cluster.

Iterative Determination of New Center Positions

The present invention identifies and solves an intrinsic problem that causes the sensitivity to initialization problem of prior art clustering methods (e.g., K-Means). This problem of prior art clustering schemes is a "winner-takes-all" partitioning strategy, which makes the association between data points and the nearest center so strong that the membership of a data point is not changed until it is closest to a different center. This strong association drags the centers from moving out of a local density of data.

Consequently, the clustering method and system of the present invention utilizes a "winner-takes-most strategy", which is provided by the harmonic means function, to replace the "winner-takes-all" strategy.

With this new strategy, the present invention's association of the data points with the centers is distributed, and the transition of a center between two data clusters becomes continuous.

The present invention also introduces a parameter ("s") which further reduces the strength of association of the data points in a cluster that trapped more than one center. By reducing the strength of association of the data points in a cluster, the present invention allows an easier escape of trapped centers. The value of the parameter s may, for example, be in a range between about two and about four. It is noted that when parameter s is about four, the performance is similar to the prior art K-Means clustering method.

Consequently, to reduce sensitivity to initialization, a value of between about two and about three is preferred. The inventors have determined that as the value of the parameter s decreases from about three to about two the sensitivity to the initialization also decreases. However, when the parameter s is lower, the centers tend to converge in a slower fashion (i.e., more computation time is needed to generate the final center points) as compared to when the parameter s is higher.

Accordingly, the value of s can be adjusted to suit a particular application's requirements for convergence speed and level of insensitivity to initialization. For example, when processing speed is not an issue, and when very little prior information exists, it is preferable that the parameter s be adjusted to a value closer to about two. However, when processing speed is critical for an application, and prior information may be available, it is preferably that the parameter s be adjusted to a value that is closer to about three.

By utilizing these novel aspects, the harmonic average clustering method and system of the present invention is essentially insensitive to initialization. When the initializations of all centers are located outside the data region or concentrated in one or two local densities, the present invention causes the centers travel across local densities of data without getting trapped. Furthermore, the harmonic average clustering of the present invention converges very well.

Exemplary Implementation of K-Harmonic Means

The K-Harmonic Means method of the present invention has the following steps:

1. Loading the data to memory.
2. Choose a number of clusters, K, to be found based on user's desire.
3. Take an arbitrary initial position of K centers.
4. Calculate the distances from each data point to each center, $d_{i,l}$, and then use the following formula to calculate the new center positions iteratively.

$$\vec{m}_k = \frac{\sum_{i=1}^{N} \frac{1}{\left(d_{i,k}^s \left(\sum_{l=1}^{K} \frac{1}{d_{i,l}^2}\right)\right)^2} \vec{x}_i}{\sum_{i=1}^{N} \frac{1}{\left(d_{i,k}^s \left(\sum_{l=1}^{K} \frac{1}{d_{i,l}^2}\right)\right)^2}}$$

The K-Harmonic Means method converges to a set of most desirable center locations, which mark the center of the clusters.

It is noted that a naive implementation of the K-Harmonic Means algorithm tends to encounter numerical difficulties due to the reciprocals, $1/\|x-m\|^2$, in the recursion formula. These numerical difficulties can cause a computer system to crash, stall, hang, or offer intolerable performance (e.g., very slow computation times or generate errors).

Since proper calculation of the coefficients is important to avoid the numerical difficulties noted above, in the preferred embodiment of the present invention, the above expression for new center positions is calculated by using the following expressions for intermediate results in an order from left to right:

$$\alpha_i = \frac{1}{\left(\sum_{l=1}^{K} \frac{1}{d_{i,l}^2}\right)^2}, \quad q_{i,k} = \frac{\alpha_i}{d_{i,k}^4}, \quad q_i = \sum_{k=1}^{K} q_{i,k},$$

$$p_{i,k} = \frac{q_{i,k}}{q_i}, \quad m_k = \sum_{i=1}^{N} p_{i,k} x_i.$$

The calculation of $q_{i,k}$'s above, where the difficulties occur, are preferably determined as follows:

$$q_{i,k} = \frac{d_{i,min}^4}{d_{i,k}^s \left[1 + \sum_{l \neq min}\left(\frac{d_{i,min}}{d_{i,l}}\right)^2\right]^2} = \frac{\left(d_{i,min}^{4-s}\left(\frac{d_{i,min}}{d_{i,k}}\right)\right)^s}{\left[1 + \sum_{l \neq min}\left(\frac{d_{i,min}}{d_{i,l}}\right)^2\right]^2} \quad (*)$$

The following illustrates an exemplary pseudo-code that can be utilized to implement the formula for calculating the new center positions iteratively:

Calculate_q_vector($x_i$,M):
/* Index i is fixed inside this function. The function is called for i. */
Step 1: calculate $d_{i,k}=\|x_i-m_k\|$, for k=1, ..., K.
Step 2: search for $d_{i,min}=\min\{d_{i,k} | k=1, \ldots, K\}$.
Step 3: form vector $<d_{i,min}/d_{i,k}|k=1, \ldots, K>$ ($d_{i,min}/d_{i,min}$ is always set to 1. If $d_{i,min}=0$, all other components are set to zero.)
Step 4: calculate the q vector from (*).

By utilizing the above implementation steps, the problems due to the reciprocals, $1/\|x-m\|^2$, in the recursion formula are avoided, and an efficient processing of the harmonic average clustering method of the present invention is assured.

There are numerous applications that can utilize the harmonic average clustering method and system of the present invention to cluster data. For example, these applications include, but are not limited to, data mining applications, customer segmentation applications, document categorization applications, scientific data analysis applications, data compression applications, vector quantization applications, and image processing applications.

The foregoing description has provided examples of the present invention. It will be appreciated that various modifications and changes may be made thereto without departing from the broader scope of the invention as set forth in the appended claims. For example, although a Euclidean distance function, which is a special case of the L_n distance function, has been described, other distance functions, such as other L_n distance functions (e.g., where n=3, 4, 5, ..., etc. or when n is fraction), can be utilized in the harmonic average clustering method of the present invention. Furthermore, it is noted that the harmonic average clustering method of the present invention can be extended for multiple attributes or features.

What is claimed is:

1. A method for clustering data comprising:
    (a) receiving a plurality of data points for clustering;
    (b) receiving a parameter (K) for specifying the number of clusters;
    (c) initializing K center points; and
    (d) for each center point determining a new center position by utilizing a K-Harmonic Means performance function.

2. The method of claim 1 wherein step (d) is repeated until an optimal location is determined for each center point.

3. The method of claim 2 wherein the K-Harmonic Means performance function includes a distance function for determining the distance between the data points and the K center points.

4. The method of claim 3 wherein the distance function is an Euclidean distance function.

5. The method of claim 2 wherein step (d) is repeated until a predetermined metric converges.

6. The method of claim 1 wherein determining a new center position by utilizing a K-Harmonic Means performance function further comprises:

applying an optimization algorithm to the KHM performance function to determine a local optimum of the performance function; and using the local optimum to generate the new position for each center.

7. The method of claim 6 wherein applying an optimization algorithm to the KHM performance function to determine a local optimum of the performance function further includes performing a partial derivative of the KHM performance function with respect to the K center positions;

setting the partial derivative of the KHM performance function to zero; and solving for the center positions.

8. The method of claim 1 wherein determining a new center position by utilizing a K-Harmonic Means performance function further comprises:
    a) determining the distance from each data point to each of the K centers; and
    b) determining the harmonic-averages of the distances between each of the data points to each of the K centers.

9. The method of claim 8 wherein the clustering method includes a sensitivity to convergence quality and further comprises:

using a dynamic weighting function to reduce the sensitivity of the convergence quality to the initialization of the center points.

10. The method of claim 1 wherein the clustering method employs a winner-take-most strategy to distribute the association of data points with center points; and wherein the transition of a center between two data clusters is continuous.

11. The method of claim 10 wherein the winner-take-most strategy includes using a harmonic means function to distribute the association of data points with center points.

12. The method of claim 1 wherein the KHM performance function includes a parameter for reducing the strength of association between the data points in a cluster to allow an easier escape of a trapped center point.

13. The method of claim 1 further comprising:
    a) determining the distances from each data point to each center;
    b) determining new positions ($m_k$) for each center point;
    c) repeating step (b) until a predetermined convergence metric is satisfied.

14. The method of claim 1 wherein the clustering method is utilized in one of a data mining application, customer segmentation application, document categorization application, scientific data analysis application, data compression application, vector quantization application, and image processing application.

15. The method of claim 1 wherein the K-Harmonic Means performance function is expressed as the following equation $$Perf_{KGM}(\{x_i\}_{i=1}^{N}, \{m_l\}_{l=1}^{K}) = \sum_{i=1}^{N} \frac{1}{\sum_{l=1}^{K} \frac{1}{\|x_i - m_l\|^2}}$$

wherein $\{m_l | l=1, \ldots, K\}$ are K centers and $\{x_i | i=1, \ldots, N\}$ are the N given data points.

16. A apparatus for clustering data comprising:

(a) an initialization source for generating initial center points; and (b) a harmonic average clustering system coupled to the initialization source, the harmonic average clustering system having a first input for receiving a plurality of data points, a second input for receiving a number of clusters, a third input for receiving the initialization center points, a fourth input for receiving an s parameter, and a fifth input for receiving a harmonic average performance function, and based thereon for generating optimized center points.

17. The apparatus of claim 16 further comprising:

(a) a dynamic weighting mechanism for selectively weighting the data points based on the number of currently trapped centers; and (b) a harmonic average optimization mechanism for receiving a harmonic average performance function and utilizing the harmonic average performance function to generate new center points.

18. The apparatus of claim 17 further comprising:

(a) a winner-takes-most mechanism for improving the transition of centers from one data cluster to another data cluster.

19. The apparatus of claim 17 wherein the dynamic weighting of the data points allows an easier escape of trapped centers and the dynamic weighting mechanism modifies the dynamic weighting based on a value of the s parameter.

20. The apparatus of claim 16 wherein the harmonic average performance function is expressed as the following equation $$Perf_{KGM}(\{x_i\}_{i=1}^{N}, \{m_l\}_{l=1}^{K}) = \sum_{i=1}^{N} \frac{1}{\sum_{l=1}^{K} \frac{1}{\|x_i - m_l\|^2}}$$

wherein $\{m_l | l=1, \ldots, K\}$ are K centers and $\{x_i | i=1, \ldots, N\}$ are the N given data points.

* * * * *